(12) United States Patent
Li

(10) Patent No.: US 7,092,489 B2
(45) Date of Patent: Aug. 15, 2006

(54) X-RAY IRRADIATOR AND X-RAY IMAGING APPARATUS

(75) Inventor: Yuqing Li, Beijing (CN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 11/297,700

(22) Filed: Dec. 8, 2005

(65) Prior Publication Data

US 2006/0126792 A1 Jun. 15, 2006

(30) Foreign Application Priority Data

Dec. 9, 2004 (CN) .................. 2004 1 0100382

(51) Int. Cl.
  *G21K 1/02* (2006.01)
  *H05G 1/06* (2006.01)
  *F16B 5/06* (2006.01)
(52) U.S. Cl. ................ 378/147; 378/193; 403/338
(58) Field of Classification Search ............. 378/147, 378/148, 149, 150, 151, 152, 153, 193; 403/335, 403/336, 338
  See application file for complete search history.

(56) References Cited

U.S. PATENT DOCUMENTS 3,829,701 A * 8/1974 Hura ................. 378/153
4,123,657 A 10/1978 Krippner et al.
4,246,488 A * 1/1981 Hura ................. 378/151
4,313,349 A 2/1982 Heitman et al.
4,464,778 A * 8/1984 Goldmann ............ 378/150
4,663,531 A * 5/1987 Ruike ............... 250/363.1
4,880,985 A * 11/1989 Jones ............... 250/505.1
5,438,605 A 8/1995 Burke et al.

FOREIGN PATENT DOCUMENTS

JP 2003-061941 3/2003

* cited by examiner

*Primary Examiner*—Edward J. Glick
*Assistant Examiner*—Mona Sanei
(74) *Attorney, Agent, or Firm*—Carl B. Horton, Esq.; Armstrong Teasdale LLP

(57) ABSTRACT

With a view to providing an X-ray irradiator superior in workability in mounting a collimator box to an X-ray tube, the X-ray irradiator includes: a ring provided on an entry plate of the collimator box so as to surround an X-ray incidence window, the ring receiving therein a flange of the X-ray tube and having plural slots formed radially through the ring; plural tongue pieces inserted through the slots from outside to inside of the ring and holding down the back side of the flange; and a pair of half-rings which holds the plural tongue pieces at positions outside the ring and which, when one ends and opposite ends thereof are respectively opposed to each other, surrounds the ring with the plural tongue pieces inserted respectively into the plural slots.

10 Claims, 6 Drawing Sheets

X-RAY IRRADIATOR AND X-RAY IMAGING APPARATUS

CROSS REFERENCE TO RELATED APPLICATIONS

This application claims the benefit of Chinese Application No. 200410100382.1 filed Dec. 9, 2004.

BACKGROUND OF THE INVENTION

The present invention relates to an X-ray irradiator and an X-ray imaging apparatus. Particularly, the present invention is concerned with an X-ray irradiator and an X-ray imaging apparatus in which X-rays from an X-ray tube are radiated to a subject through a collimator.

In an X-ray imaging apparatus, X-rays are radiated to a subject while limiting an irradiation field by a collimator. The collimator is accommodated within a collimator box which is secured to an X-ray tube (see, for example, Patent Literature 1).

[Patent Literature 1] Japanese Unexamined Patent Publication No. 2003-61941 (page 3, FIG. 1)

The mounting of a collimator box to an X-ray tube is performed using screws, but at least three screws are required. The load of the collimator box is imposed on those screws, so when mounting the collimator box to the X-ray tube, a tightening torque must be adjusted precisely with respect to all of the screws. Thus, the workability in manufacture and maintenance is poor, and if the tightening of the screws is not proper, there is a fear of fall-off of the collimator box.

SUMMARY OF THE INVENTION

Therefore, it is an object of the present invention to provide such an X-ray irradiator and an X-ray imaging apparatus as permit mounting of a collimator box to an X-ray tube in high workability. It is another object of the present invention to provide an X-ray irradiator and an X-ray imaging apparatus which are constructed so as to make the fall-off of a collimator box difficult.

In one aspect of the present invention for solving the above-mentioned problems there is provided an X-ray irradiator comprising: an X-ray tube having a flange formed so as to surround an X-ray output window, the flange having a notch formed in a peripheral edge thereof; a collimator box having an entry plate formed with an X-ray incidence window, the collimator box accommodating a collimator in the interior thereof; a ring provided on the entry plate so as to surround the X-ray incidence window, the ring receiving therein the flange of the X-ray tube and having a plurality of slots formed radially through the ring; a first tongue piece inserted through one of the plural slots from outside to inside of the ring by means of a spring and fitted at a front end portion thereof into the notch formed in the peripheral edge of the flange; a lock means for locking the first tongue piece unlockably; a plurality of second tongue pieces being inserted through the remaining slots of the plural slots from outside to inside of the ring and holding down a back side of the flange; a pair of half-rings each taking a partial charge of holding the plural second tongue piece at positions outside the ring, the pair of half-rings, when one ends and opposite ends thereof are respectively opposed to each other, surrounding the ring in a state in which the plural second tongue pieces are inserted respectively into the plural slots, the opposite ends of the pair of half-rings being pivotally connected to the entry plate so that the one ends thereof can be opened and closed; and a connecting means for disconnectably connecting the pair of half-rings in a closed state of the one ends of the half-rings.

In another aspect of the present invention for solving the above-mentioned problems there is provided an X-ray imaging apparatus comprising an X-ray irradiator and an X-ray detector opposed to each other. The X-ray irradiator comprises: an X-ray tube having a flange formed so as to surround an X-ray output window, the flange having a notch formed in a peripheral edge thereof; a collimator box having an entry plate formed with an X-ray incidence window, the collimator box accommodating a collimator in the interior thereof; a ring provided on the entry plate so as to surround the X-ray incidence window, the ring receiving therein the flange of the X-ray tube and having a plurality of slots formed radially through the ring; a first tongue piece inserted through one of the plural slots from outside to inside of the ring by means of a spring and fitted at a front end portion thereof into the notch formed in the peripheral edge of the flange; a lock means for locking the first tongue piece unlockably; a plurality of second tongue pieces being inserted through the remaining slots of the plural slots from outside to inside of the ring and holding down a back side of the flange; a pair of half-rings each taking a partial charge of holding the plural second tongue pieces at positions outside the ring, the pair of half-rings, when one ends and opposite ends thereof are respectively opposed to each other, surrounding the ring in a state in which the plural second tongue pieces are inserted respectively into the plural slots, the opposite ends of the pair of half-rings being pivotally connected to the entry plate so that the one ends thereof can be opened and closed; and a connecting means for disconnectably connecting the pair of half-rings in a closed state of the one ends of the half-rings.

In order to make the collimator box rotatable 90° at a time, it is preferable that the notch is constituted of four notches formed at equal intervals along the peripheral edge of the flange.

In order to facilitate locking and unlocking, it is preferable for the lock means to have a locking screw.

In order to hold down the flange uniformly, it is preferable that the plural second tongue pieces comprise four tongue pieces which hold down the back side of the flange at four equally spaced positions along the circumference of the flange.

In order to facilitate connection and disconnection, it is preferable for the connecting means to have a connecting bolt.

In the X-ray irradiator according to the present invention, the collimator box can be mounted to the X-ray tube by only connecting one ends of the pair of half-rings having the plural second tongue pieces through the connecting means. Thus, the workability in mounting the collimator box to the X-ray tube is high and there is no fear of fall-off of the collimator box. Further, since the collimator box becomes rotatable by unlocking the first tongue piece, it is easy to adjust the rotational angle of the collimator box.

Further objects and advantages of the present invention will be apparent from the following description of the preferred embodiments of the invention as illustrated in the accompanying drawings.

DETAILED DESCRIPTION OF THE INVENTION

Figure 1:
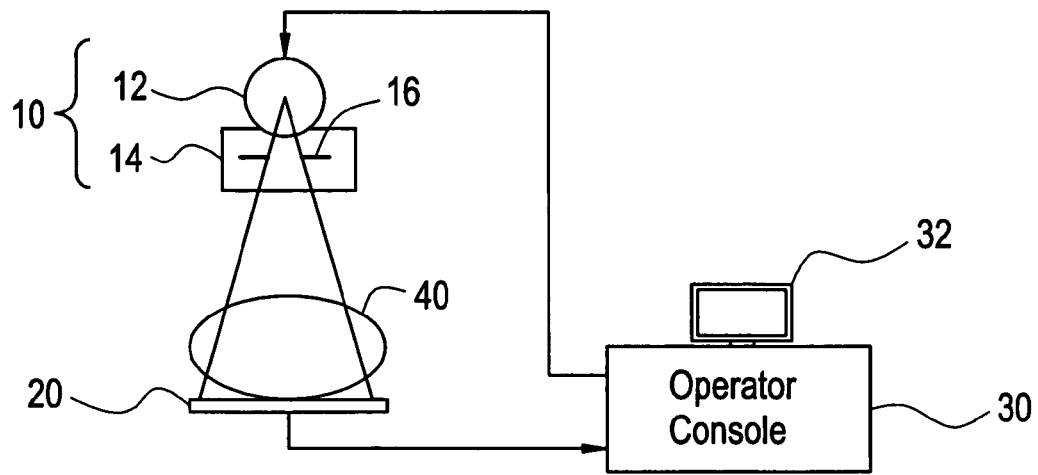
FIG. 1 illustrates a schematic construction of an X-ray imaging apparatus.

A best mode for carrying out the present invention will be described in detail hereinunder with reference to the drawings. The present invention is not limited to the best mode for carrying out the invention. FIG. 1 shows a schematic construction of an X-ray imaging apparatus. This apparatus is an example of a mode for carrying out the present invention. With the construction of this apparatus, an example of a mode for carrying out the present invention with respect to the X-ray imaging apparatus of the invention is shown.

As shown in the same figure, this apparatus includes an X-ray irradiator 10, an X-ray detector 20, and an operator console 30. The X-ray irradiator 10 and the X-ray detector 20 are opposed to each other with a subject 40 therebetween. The X-ray irradiator 10 is an example of a mode for carrying out the present invention. With the construction of this device, an example of a mode for carrying out the present invention with respect to the X-ray irradiator of the invention is shown.

The X-ray irradiator 10 includes an X-ray tube 12 and a collimator box 14, with a collimator 16 accommodated within the collimator box 14. X-rays emitted from the X-ray tube 12 are radiated to the subject 40 through an aperture of the collimator 16. The collimator aperture is variable, making an X-ray irradiation field adjustable.

The X-rays which have passed through the subject 40 are detected by the X-ray detector 20 and inputted to the operator console 30. In accordance with the inputted signal the operator console 30 re-constructs a radioscopic image of the subject 40. The radioscopic image thus re-constructed is displayed on a display 32. Further, the operator console 30 controls the X-ray irradiator 10. The X-ray detector 20 may be a photosensitive material which is exposed to X-rays. In this case, the radioscopic image is visualized by development.

Figure 2:
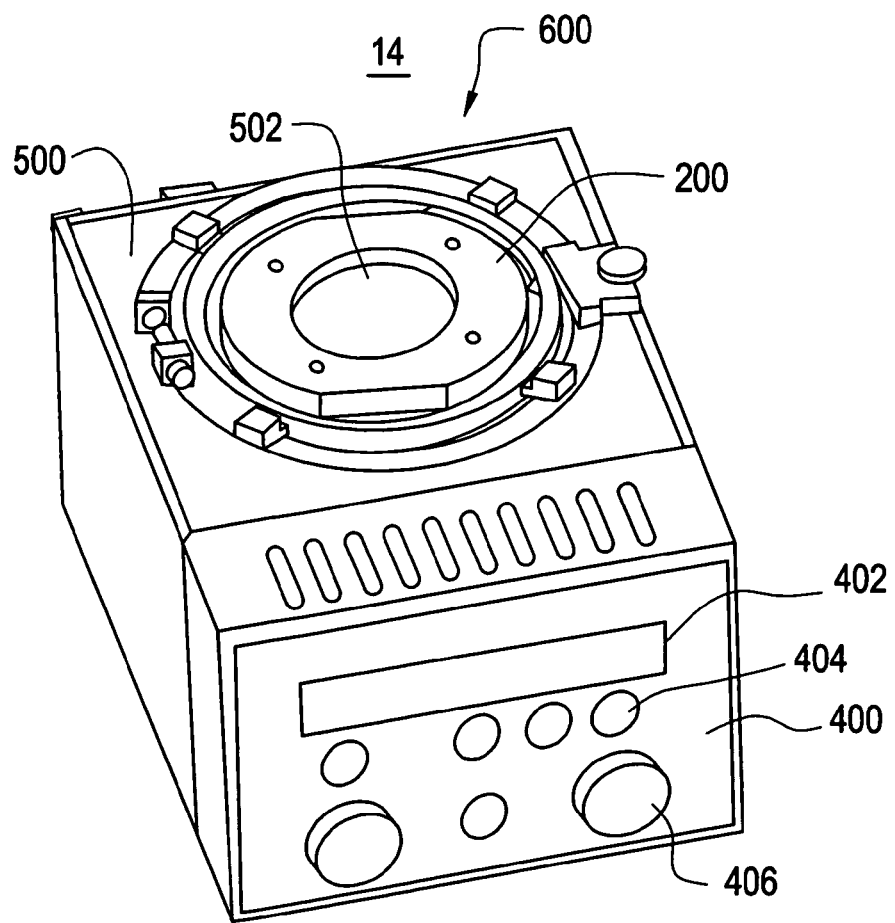
FIG. 2 illustrates an appearance of a collimator box.

FIG. 2 shows the appearance of the collimator box 14 together with a flange 200 of the X-ray tube 12 to which the collimator box is secured. The X-ray tube 12 overlies the flange 200 and is integral with the flange. Thus, the flange 200 is a part of the X-ray tube 12.

As shown in the same figure, the collimator box 14 is a box of a generally rectangular parallelepiped and houses therein the collimator 16. The front side of the collimator box 14 is formed as an interface 400 for an operator to adjust the aperture of the collimator 16. An indicator 402, pushbuttons 404 and knobs 406 are provided on the interface 400.

An upper surface of the collimator box 14 is formed by an entry plate 500. The entry plate 500 has an X-ray incidence window 502. A mounting mechanism 600 for mounting the collimator box 14 to the flange 200 of the X-ray tube 12 is provided around the X-ray incidence window 502.

Figure 3:
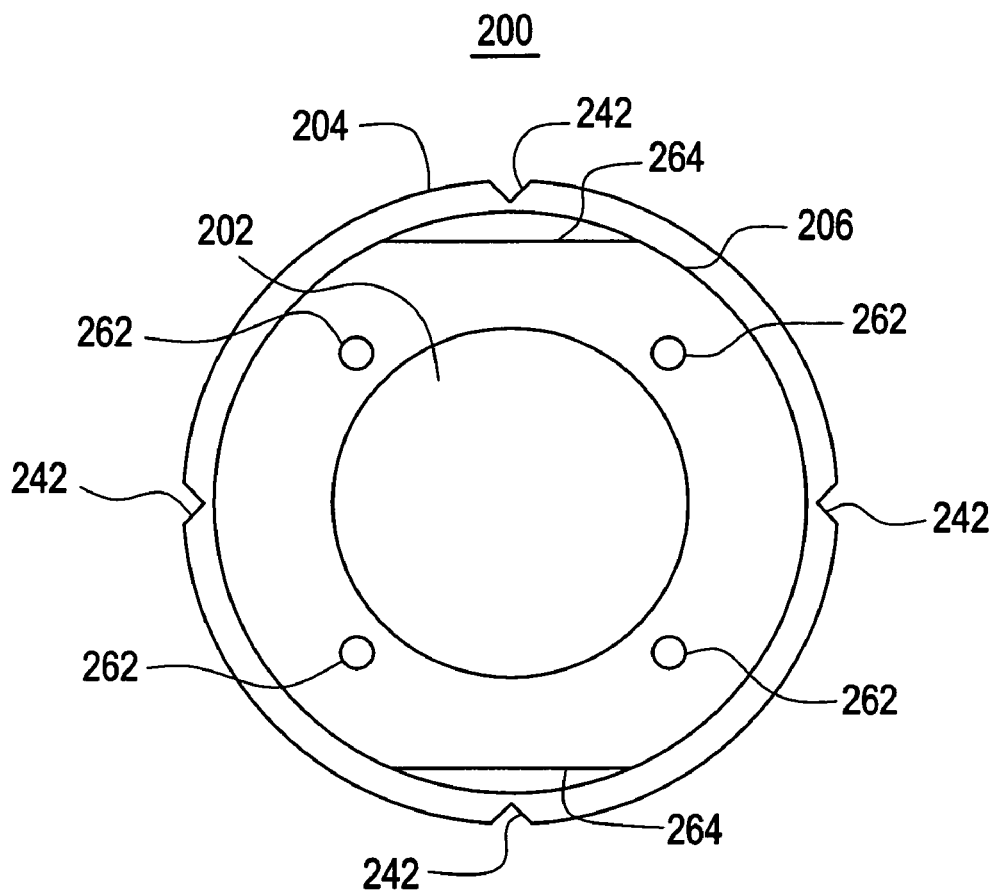
FIG. 3 is a plan view of a flange of an X-ray tube.
Figure 4:
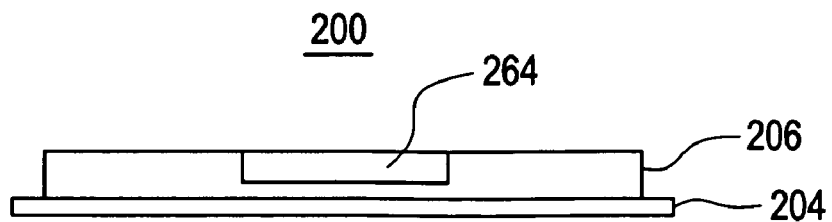
FIG. 4 is an elevation thereof.

FIGS. 3 and 4 are a plan view and an elevation, respectively, of the flange 200. As shown in both figures, the flange 200 is a stepped disc having a central opening 202. The central opening 202 serves as an X-ray outlet window.

A large-diameter portion 204 of the disc has four notches 242 arranged at equal intervals in the circumferential direction. The notches 242 are V-shaped notches. A divergence angle of the V shape is, for example, 90°.

Four holes 262 for screwing the flange to the body of the X-ray tube are formed in a small-diameter portion 206 of the disc at equal intervals in the circumferential direction and in parallel with the axis of the disc.

A pair of parallel surfaces 264 for representing a reference direction is formed as side surfaces in the small-diameter portion 206.

Figure 5:
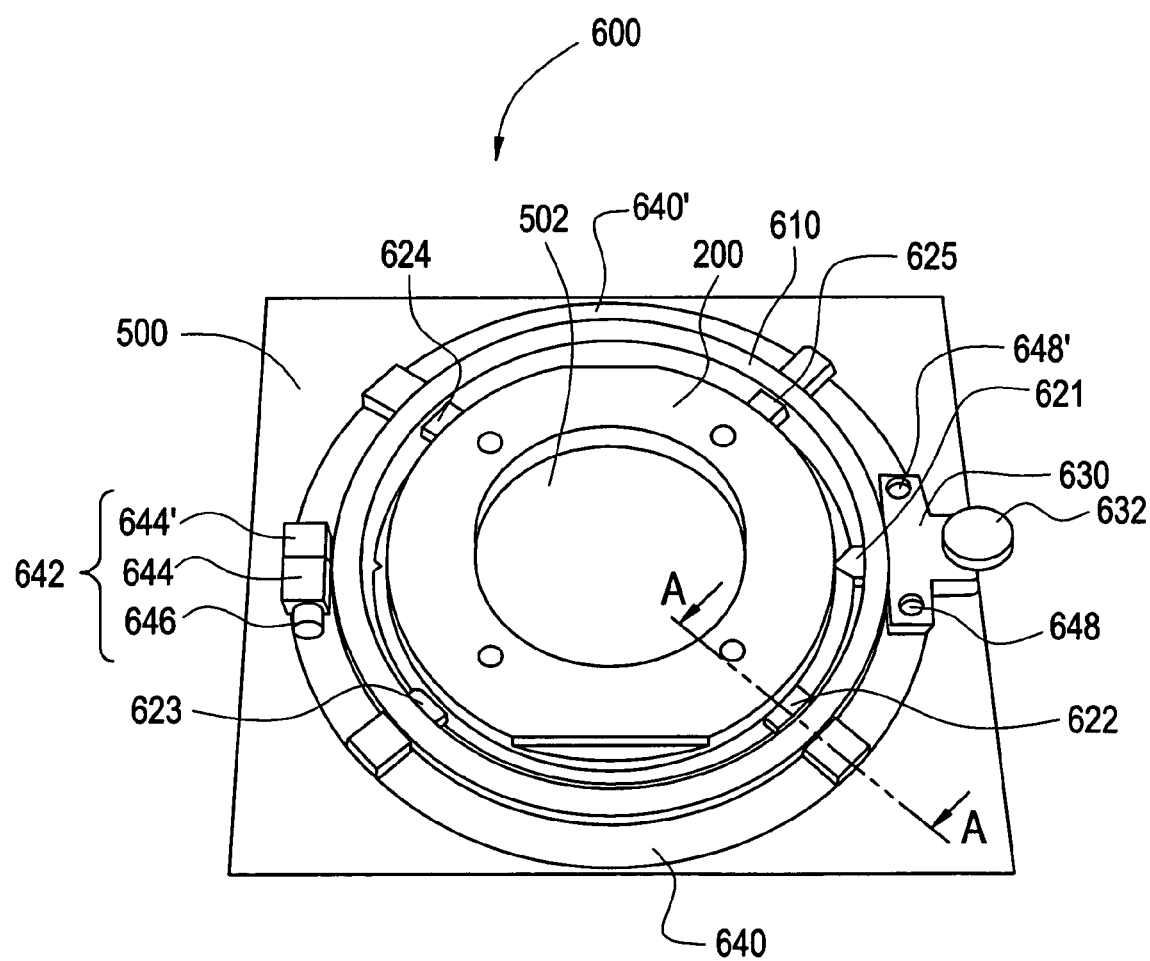
FIG. 5 illustrates the construction of a collimator box mounting mechanism.

A close-up of the entry plate 500 having the mounting mechanism 600 is shown together with the flange 200 in FIG. 5. As shown in the same figure, the mounting mechanism 600 has a ring 610. The ring 610 is mounted on the entry plate 500 so as to be concentric with the X-ray incidence window 502. For example, the mounting of the ring 610 to the entry plate 500 is performed using screws from the back side. The inside diameter of the ring 610 matches the outside diameter of the large-diameter portion 204 of the flange 200. Thus, the ring 610 can be mounted with the flange 200 fitted therein.

The ring 610 has five slots formed radially through the ring, which slots will be described later. Five tongue pieces 621 to 625 are inserted respectively through those slots from outside to inside of the ring 610.

A front end of the tongue piece 621, of those tongue pieces, is adapted to fit in one of the notches 242 formed in the flange 200. The tongue piece 621 is pushed out by means of a spring from a sheath 630 disposed outside the ring 610. A lock screw 632 which can lock the tongue piece 621 is provided on the sheath 630.

The tongue piece 621 biased with the spring constitutes a click mechanism together with the notches 242.

Since there are four notches 242 formed at equal intervals along the circumference of the flange 200, the click mechanism can restrict the rotational angle of the collimator box 14, i.e., the rotational angle of the X-ray irradiation field, in 90° step. The number and spacing of the notches 242 may be set appropriately in accordance with a desired rotational angle step.

A rotational position of the collimator box 14 is fixed by locking the tongue piece 621 with the lock screw 632. With the lock screw 632, the tongue piece 621 can be locked and unlocked easily.

The remaining four tongue pieces 622 to 625 hold down the back side of the large-diameter portion 204 of the flange 200 from above at four equally spaced positions along the circumference, whereby the collimator box 14 is clamped to the X-ray tube 12.

Since the four tongue pieces 622 to 625 respectively hold down the back side of the large-diameter portion 204 of the flange 200 at four equally spaced positions along the circumference, the flange can be held down uniformly. The number of the tongue pieces for holding down the flange 200 may be three or five or more.

The tongue pieces 622 to 625 are held in a shared manner by a pair of half-rings 640 and 640' at positions outside the ring 610. More specifically, the tongue pieces 622 and 623 are held by the half-ring 640, while the tongue pieces 624 and 625 are held by the half-ring 640'.

The tongue pieces 622 to 625 are secured to the half-rings 640 and 640', for example, with screws from the back side of the half-rings. As a result, in an assembled state, it is impossible to make access to the screw heads and thus there is no fear that the screws may be loosened by mistake with consequent fall-off of the collimator box 14.

Figure 6:
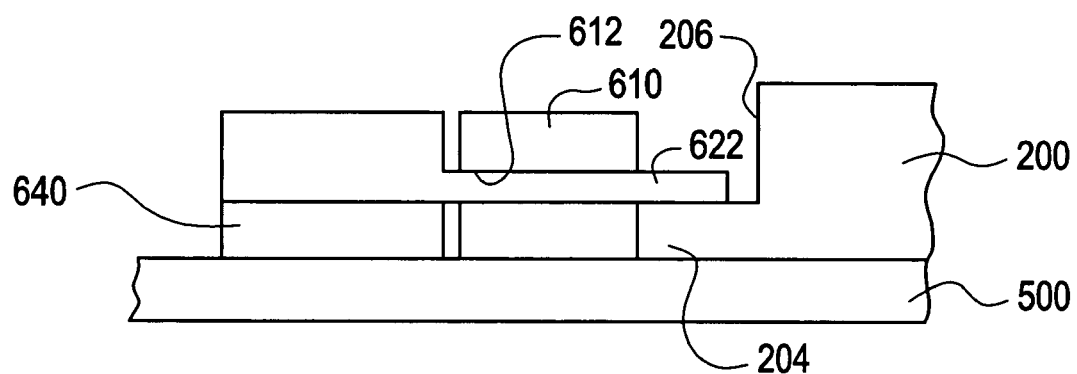
FIG. 6 illustrates a state in which the flange is held down.

FIG. 6 shows a state in which the flange 200 is held down by the tongue pieces 622. FIG. 6 corresponds to a sectional view taken on line A—A in FIG. 5. As shown in FIG. 6, the tongue piece 622 held by the half-ring 640 is inserted from outside to inside through a slot 612 formed in the ring 610 and holds down the back side of the large-diameter portion 104 of the flange 200. As a result, the large-diameter portion 204 of the flange 200 is held between the tongue piece 622 and the entry plate 500. This is also the case with the other tongue pieces 623 to 625.

The half-rings 640 and 640' are provided in such a manner that their one ends and opposite ends are respectively opposed to each other so as to surround the ring 610. One ends of the half-rings 640 and 640' are connected together by a connecting means 642. For example, the connecting means 642 is made up of a pair of nuts 644 and 644' fixed respectively to one ends of the half-rings 640 and 640' and a bolt 646 for connecting those nuts.

Opposite ends of the half-rings 640 and 640' are secured to the entry plate 500 with pins 648 and 648'. The half-rings 640 and 640' are rotatable along the surface of the entry plate 500. Therefore, when the connected state of the half-rings by the connecting means 642 is released, the half-rings 640 and 640' can be rotated in directions opposite to each other so that the closed portion becomes open.

Figure 7:
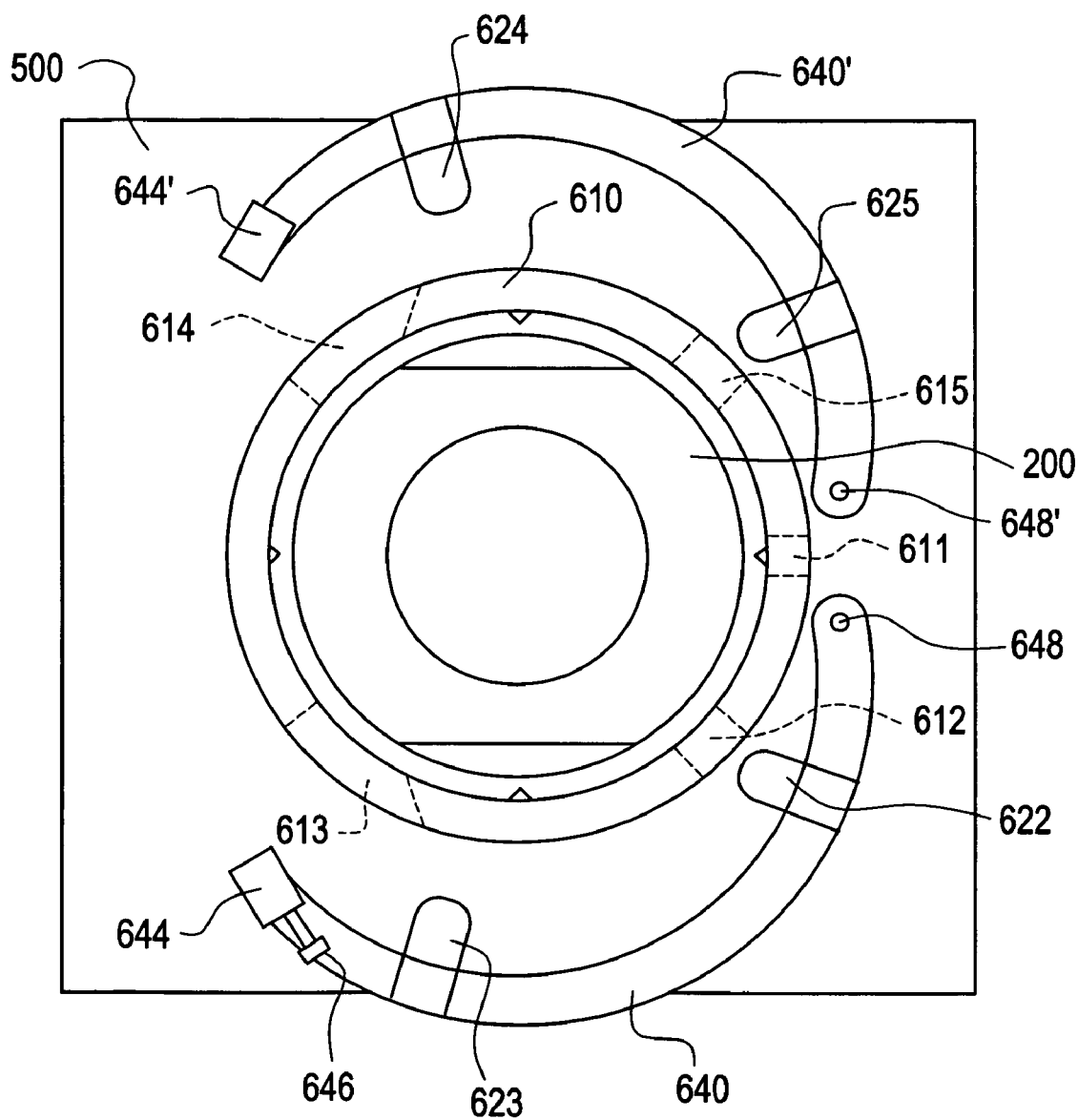
FIG. 7 illustrates a released state of the flange.

This state is shown in FIG. 7, in which the tongue piece 621, sheath 630 and lock screw 632 are omitted. As shown in the same figure, the half-rings 640 and 640' are widely open on their one ends side and the four tongue pieces 622 to 625 are extracted from the slots 612 to 615 formed in the ring 610. In this state, the flange 200 is no longer held down by the tongue pieces 622 to 625, so that the collimator box 14 can be removed from the X-ray tube 12.

All that is required for mounting the collimator box 14 to the X-ray tube 12 is merely fitting the flange 200 of the X-ray tube 12 in the ring 610 in an open condition of the half-rings 640 and 640', then closing the half-rings 640 and 640' and connecting one ends of the half-rings with each other by use of the connecting means 642.

Thus, the collimator box 14 can be mounted to the X-ray tube 12 by an extremely simple operation, so that the workability in mounting the collimator box 14 to the X-ray tube 12 is improved to a greater extent than in the use of plural mounting screws as in the prior art.

Besides, with the bolt 646, the connection and disconnection of one ends of the half-rings 640 and 640' can be done easily. Moreover, since the weight of the collimator box 14 is not imposed on the bolt 646 of the connecting means 642, the bolt 646 need not have a strength high enough to withstand the load of the collimator box 14. Further, it is not necessary, either, to precisely adjust the tightening torque for the bolt 646.

Figure 8:
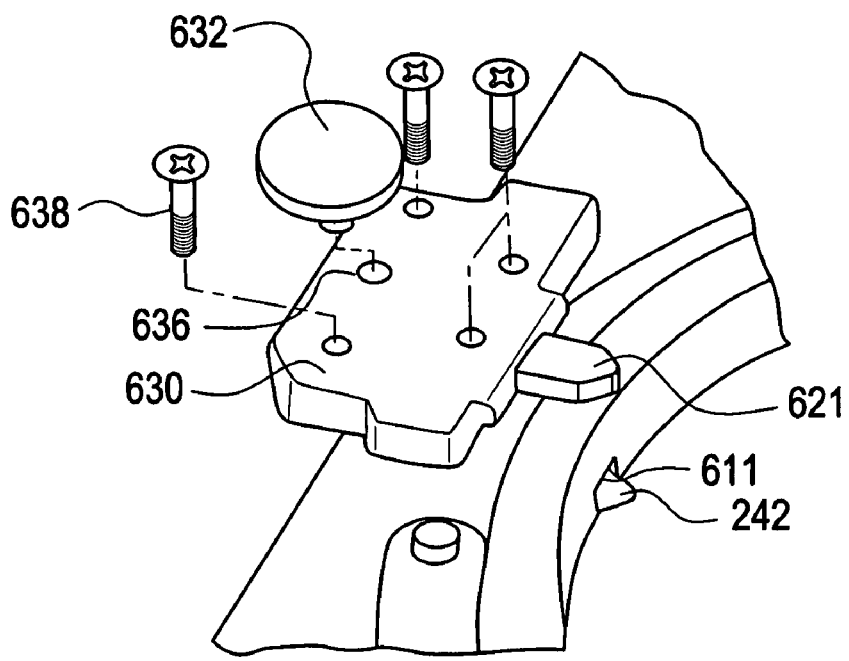
FIG. 8 illustrates the construction of a click mechanism.
Figure 9:
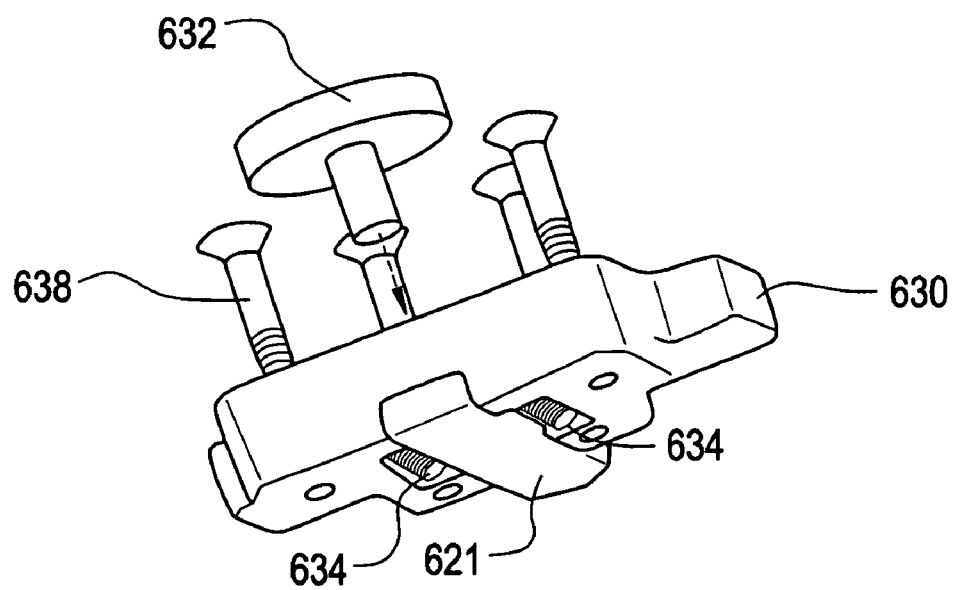
FIG. 9 also illustrates the construction of the click mechanism.

The construction of the click mechanisms is shown in terms of exploded diagrams in FIGS. 8 and 9. As shown in both figures, the tongue piece 621 is pushed out from the sheath 630 by springs 634. The front end of the tongue piece 621 is fitted in one of the notches 242 of the flange 200 through a slot 611 formed in the ring 610.

The lock screw 632 is put in engagement with a tapped hole 636 formed in the sheath 630 and its tip end pushes the tongue piece 621 against the entry plate 500 to lock the tongue piece. This locked state is released by loosening the lock screw 632. With four screws 638, the sheath 630 is secured to the entry plate 500.

Many widely different embodiments of the invention may be configured without departing from the spirit and the scope of the present invention. It should be understood that the present invention is not limited to the specific embodiments described in the specification, except as defined in the appended claims.

The invention claimed is:

1. An X-ray irradiator comprising:
an X-ray tube having a flange formed so as to surround an X-ray output window, the flange having a notch formed in a peripheral edge thereof;
a collimator box having an entry plate formed with an X-ray incidence window, the collimator box accommodating a collimator in the interior thereof;
a ring provided on the entry plate so as to surround the X-ray incidence window, the ring receiving therein the flange of the X-ray tube and having a plurality of slots formed radially through the ring;
a first tongue piece inserted through one of the plural slots from outside to inside of the ring by means of a spring, and fitted at a front end portion thereof into the notch formed in the peripheral edge of the flange;
a lock device for locking the first tongue piece unlockably;
a plurality of second tongue pieces being inserted through the remaining slots of the plural slots from outside to inside of the ring, and holding down a back side of the flange;
a pair of half-rings each taking a partial charge of holding the plural second tongue pieces at positions outside the ring, the pair of half-rings, when one ends and opposite ends thereof are respectively opposed to each other, surrounding the ring in a state in which the plural second tongue pieces are inserted respectively into the plural slots, the opposite ends of the pair of half-rings being pivotally connected to the entry plate so that the one ends thereof can be opened and closed; and
a connecting device for disconnectably connecting the pair of half-rings in a closed state of the one ends of the half-rings.

2. An X-ray irradiator according to claim 1, wherein the notch comprises four notches formed at equal intervals along the peripheral edge of the flange.

3. An X-ray irradiator according to claim 1, wherein the lock device has a locking screw.

4. An X-ray irradiator according to claim 1, wherein the plural second tongue pieces comprise four tongue pieces which hold down the back side of the flange at four equally spaced positions along the circumference of the flange.

5. An X-ray irradiator according to claim 1, wherein the connecting device has a connecting bolt.

6. An X-ray imaging apparatus comprising an X-ray irradiator and an X-ray detector opposed to each other, the X-ray irradiator comprising:
an X-ray tube having a flange formed so as to surround an X-ray output window, the flange having a notch formed in a peripheral edge thereof;
a collimator box having an entry plate formed with an X-ray incidence window, the collimator box accommodating a collimator in the interior thereof;
a ring provided on the entry plate so as to surround the X-ray incidence window, the ring receiving therein the flange of the X-ray tube and having a plurality of slots formed radially through the ring;

a first tongue piece inserted through one of the plural slots from outside to inside of the ring by means of a spring, and fitted at a front end portion thereof into the notch formed in the peripheral edge of the flange;

a lock device for locking the first tongue piece unlockably;

a plurality of second tongue pieces being inserted through the remaining slots of the plural slots from outside to inside of the ring, and holding down a back side of the flange;

a pair of half-rings each taking a partial charge of holding the plural second tongue pieces at positions outside the ring, the pair of half-rings, when one ends and opposite ends thereof are respectively opposed to each other, surrounding the ring in a state in which the plural second tongue pieces are inserted respectively into the plural slots, the opposite ends of the pair of half-rings being pivotally connected to the entry plate so that the one ends thereof can be opened and closed; and a connecting device for disconnectably connecting the pair of half-rings in a closed state of the one ends of the half-rings.

7. An X-ray imaging apparatus according to claim 6, wherein the notch comprises four notches formed at equal intervals along the peripheral edge of the flange.

8. An X-ray imaging apparatus according to claim 6, wherein the lock device has a locking screw.

9. An X-ray imaging apparatus according to claim 6, wherein the plural second tongue pieces comprise four tongue pieces which hold down the back side of the flange at four equally spaced positions along the circumference of the flange.

10. An X-ray imaging apparatus according to claim 6, wherein the connecting device has a connecting bolt.

* * * * *